May 26, 1936. W. A. BERRINGER 2,042,380

RADIATOR REPAIR AND TEST APPARATUS

Filed June 13, 1935 3 Sheets-Sheet 1

William A. Berringer
INVENTOR

BY Victor J. Evans & Co.
ATTORNEY

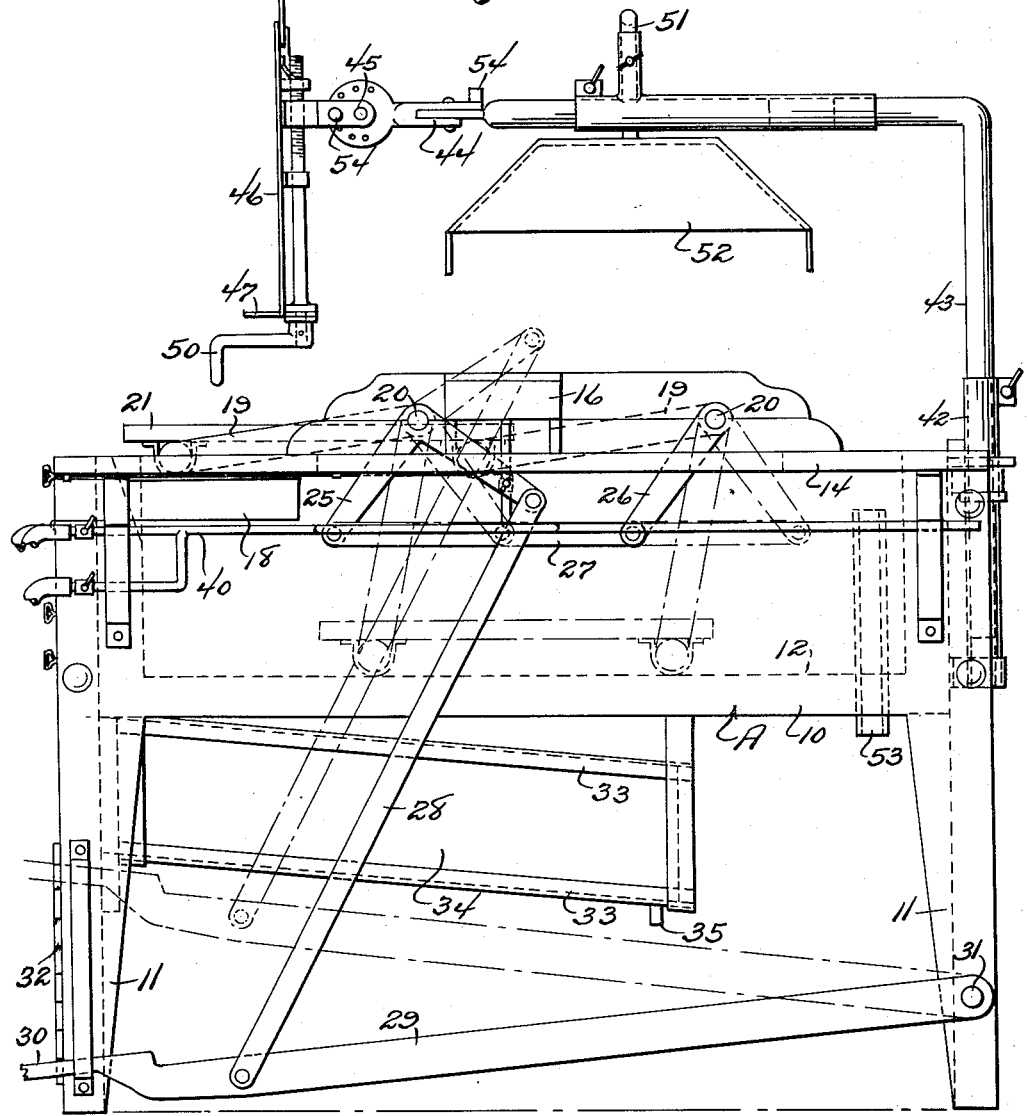

May 26, 1936.  W. A. BERRINGER  2,042,380
RADIATOR REPAIR AND TEST APPARATUS
Filed June 13, 1935   3 Sheets-Sheet 3
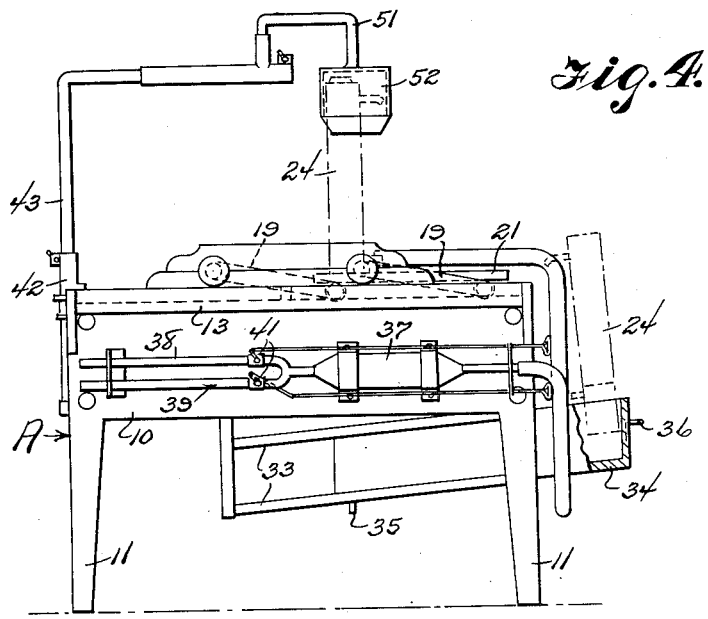
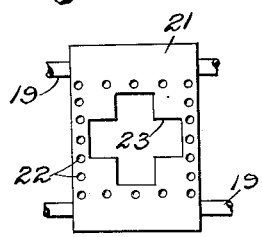
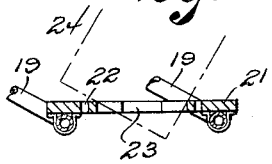
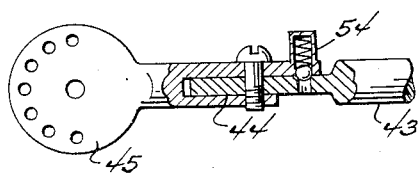
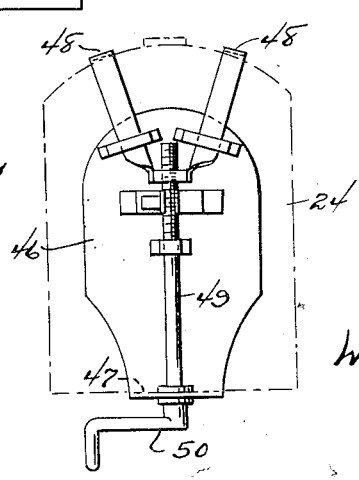
William A. Berringer
INVENTOR
BY Victor J. Evans & Co.
ATTORNEY Patented May 26, 1936

2,042,380

UNITED STATES PATENT OFFICE 2,042,380

RADIATOR REPAIR AND TEST APPARATUS

William A. Berringer, Lewisberry Pa., assignor of one-fourth to Vane H. Lowmaster, Lewisberry, Pa.

Application June 13, 1935, Serial No. 26,493

1 Claim. (Cl. 29—89)

The invention relates to a repair and test machine and more especially to radiator repair and test apparatus.

The primary object of the invention is the provision of an apparatus of this character, wherein through the instrumentality of a cradle having a platform the radiator of the automobile type can be carried in a manner for the mechanical handling thereof to lower the same to the center of a vat or tank containing water or other solutions for testing purposes and when raised therefrom will be brought forwardly so as to conveniently confront a repairman or workman and thus eliminating the necessity of such repairman or workman getting wet and at the same time enabling him to work upon the radiator both for complete repair work thereto or for finishing of the same for its installation within a motor vehicle.

Another object of the invention is the provision of an apparatus of this character, wherein the construction thereof is novel in form so that all equipment necessary for workmanship upon an automobile radiator will be close at hand and the work will be mechanically handled so that the repairman or workman will be relieved from such handling and his hands will be free for servicing such radiator, the apparatus being constructed for the handling of the work so that other equipment will not be required to finish a job and thorough testing of such work can be carried forth with dispatch.

A further object of the invention is the provision of an apparatus of this character, which is comparatively simple in construction, thoroughly reliable and efficient in its purpose and operation, strong, durable, effecting the mechanical handling of the work so that the burden is relieved from the workman and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 3 is an enlarged side elevation showing by full lines one position of the platform and cradle and by dotted lines another position thereof.

Figure 4 is a view similar to Figure 3 looking toward the opposite side of the apparatus.

Figure 5 is a detailed plan view of the platform for the cradle.

Figure 6 is a vertical longitudinal sectional view thereof.

Figure 7 is a plan view partly in section showing in detail a portion of the head crane for the radiator as associated with the apparatus.

Figure 8 is a rear elevation of the clamp as carried by the head crane showing a radiator held within the clamp.

Similar reference characters indicate corresponding parts throughout the several views in the drawings.

Figure 1:
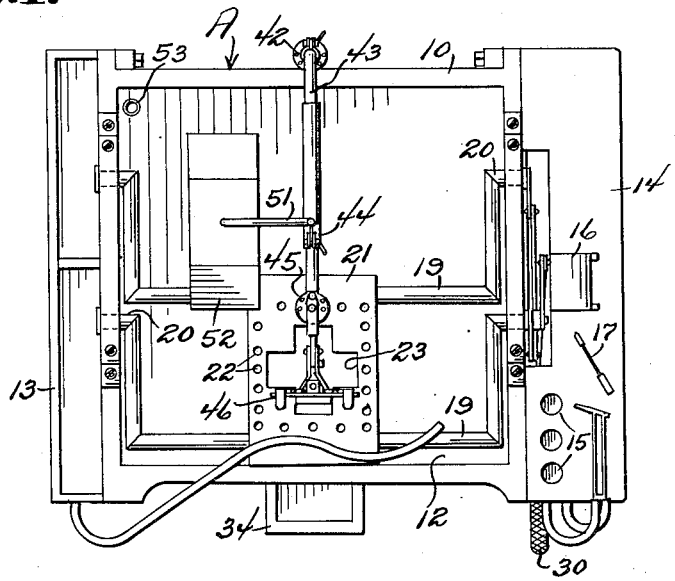
Figure 1 is a top plan view of an apparatus constructed in accordance with the invention.
Figure 2:
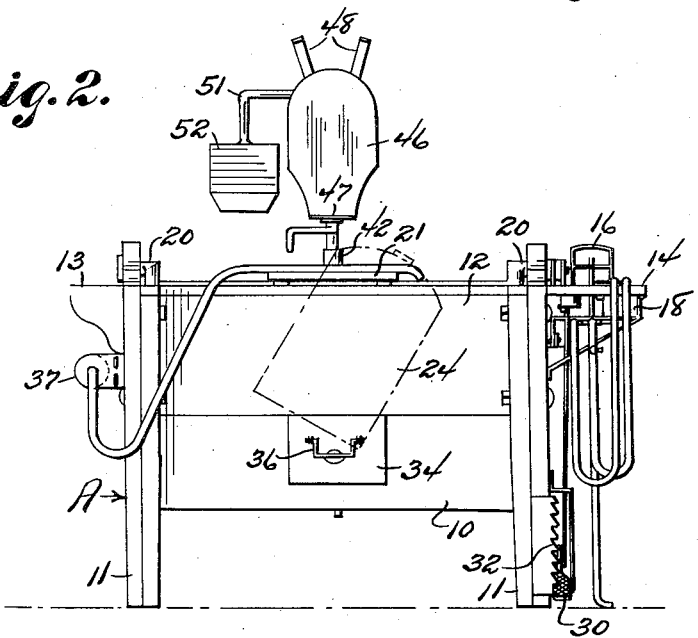
Figure 2 is a front elevation thereof.

Referring to the drawings in detail, the apparatus comprises a stand A which includes a horizontal frame 10 supported upon legs 11, these being located at the four corners of the frame and within the latter is built a vat or tank 12 open throughout the top of the frame 10 for containing water or a testing solution necessary for repairing and testing automobile radiators.

At one side of the frame 10 and projected laterally therefrom at its top is a test plug tray 13 while at the other side of said frame at its top is a shelf 14, the latter being projected laterally and has provided therein at the fore part of the same the pockets for acid pots 15. This shelf 14 is adapted to accommodate thereon soldering equipment and carries a fire pot or stove 16 for a soldering iron 17. Beneath the shelf 14 at the fore part thereof is a small drawer 18 for accommodating small tools required in repair and test work for automobile radiators, the drawer being slidably fitted and is opened by pulling outwardly thereon at the front of the same.

Located for vertical movement with relation to the vat 12 and carried in the frame 10 is a cradle including a pair of spaced transversely disposed U-shaped shafts 19, these at the journal arms 20 have bearing in opposite sides of the frame 10 and carried by these shafts or the cradle is a platform 21 provided with a series of apertures 22 and a cross-like opening or slot 23, respectively, the shafts 19 being so located in the frame 10 that on the downward swinging thereof the platform 21 will be carried to the center of the vat 12 and on upward movement of these shafts the said platform will be carried forwardly of the frame to the front thereof, this being important in the handling of an automobile radiator both for repair and test work.

The opening or slot 23 permits the seating of a radiator 24 therein either in a perpendicular position when resting directly upon the platform or in an angular position when inserted in the opening or slot 23, the positioning being required at the option of the workman during test or repair work to the radiator. The apertures 22 are to permit the platform to become submerged in the water contained within the vat 12 without excessive resistance on the lowering of the cradle.

At one side of the frame 10, preferably the right hand side thereof, are cranks 25 and 26, respectively, one being a double arm crank and the other a single arm crank and these are made fast to the journal arms 20 of the shafts 19. A connecting link 27 has pivotal connection with the arms so that the shafts 19 will be caused to swing in unison with each other while pivotally connected with the double arm crank 25 is a throw link 28, it being also pivoted to a foot actuated arm 29 having a foot treadle 30 at its forward end, the opposite end of the said arm being pivoted at 31. This arm is adapted for latching engagement with a keeper rack 32 so that it may be latched in selected adjusted positions to regulate the disposition or placement of the platform 21 with relation to the vat 12. The cradle is operated directly from this arm 29 for the raising and lowering of the platform 21 as carried by the cradle.

Beneath the vat 12 and suitably built into the stand A, preferably at the center thereof, is a rearwardly inclined drawer guide 33 having fitted therein the slidable drawer 34 which by outward pull thereon at the front of the stand A will be moved to open position. The rearmost end portion of the drawer 34 at the bottom thereof is provided with a drain 35 so that any drippings caught within the drawer will be discharged therefrom in a rearward direction.

This drawer 34 is adapted for placing radiators in various positions and is not intended for the carrying of tools as it is useful for repairing and assembling of radiators. Of course, it is to be understood that the apparatus is serviceable for work on new and old radiators. The drawer 34 when opened can serve to hold a radiator and carries at its front a pull handle 36 of conventional kind.

Located beneath the tray 13 and supported upon the frame 10 in any suitable manner is a flushing and cleaning device 37 which may be of any standard type. The air and water lines for the device 37 are indicated at 38 and 39, respectively, while the fuel feed lines for the fire pot or stove 16 are indicated at 40, these lines 38 and 39 being suitably valved and are regulated by controls 41 accessible at the front of the stand A. Also the fuel feed line is valved and has a control.

Located at the back or rear of the stand A and carried by its frame 10 is a mount 42 for a crane 43, it having associated therewith adjustable joints 44 and 45, respectively. The joint 45 has connection with a clamp 46 for the radiator, it having the stationary and adjustable jaws 47 and 48, respectively. The adjustable jaws 48 are moved by a turning stem 49 operated from a crank 50. The crane 43 is held within the mount 42 so that it can be swung laterally above the frame and also is susceptible of vertical adjustment and is conveniently extended to bring the clamp toward or away from the front of the stand.

Supplementing the crane 43 is an adjustable branch 51 carrying a crown 52 for accommodating the head of the radiator 24 when disposed perpendicular and resting upon the platform 21 when elevated from within the vat 12. The clamp 46 is separated from the crane 43 when the crown 52 is usable, the latter being swung from its normal lateral position to one side of the crane into a forward front position as will appear in Figure 4 of the drawings.

Rising within the vat 12 at the rear of the frame 10 and opening through the bottom of said vat is an overflow pipe 53 which regulates the level or depth of the water or testing solution as contained within the vat 12.

The crown 52 when capping the radiator 24 enables air and water to be deflected downwardly when the radiator 24 is being cleaned or flushed, particularly when the radiator has been lifted when the water within the vat 12 and air and water under pressure is introduced into said radiator when in the perpendicular position and hooded by the said crown 52.

It will appear from the foregoing and the drawings that the radiator is mechanically handled, thereby relieving the workman from this burden or laborious task and also giving freedom of the hands to said workman for testing and repair work. The radiator can be placed and held in any required position in the apparatus and is readily and easily submerged in the water or testing solution contained within the vat 12 and also lifted therefrom during the testing operation.

The joints 44 and 45 are latched in fixed position through the medium of latch devices 54 so that the clamp 46 can be held in its adjusted position, the joints 44 and 45 allowing universal adjustment of the said clamp.

It is to be understood that the apparatus is useful for assembling new radiators in factories where the same are to be manufactured.

It is to be understood that changes, variations and modifications may be made in the apparatus as come properly within the scope of the appended claim without departing from the spirit of the invention or sacrificing any of its advantages.

What is claimed is:

An apparatus of the class described which includes a stand provided with a vat, of a mount vertically supported at one end of the stand, a crane including an angle bar having one end received in and secured to the mount for rotary and for vertical adjustment and having its other and horizontal arm disposed over the vat, a member telescopically received in said horizontal arm and adjustably fixed therein and having an outer horizontally disposed disk shaped end, a bifurcated member pivotally associated with said disk, latching means for holding the bifurcated member when swung angularly on the disk, a vertically disposed disk on the outer end of the bifurcated member, an element pivoted to said last named disk, latching means for holding the element when swung angularly on said disk, and a clamp comprising slidably associated jaws and a handle operated screw for moving the jaws toward or away from each other and said screw being threaded through the mentioned disk carrying element.

WILLIAM A. BERRINGER.